United States Patent [19]

O'Regan et al.

[11] Patent Number: 4,475,327
[45] Date of Patent: Oct. 9, 1984

[54] ROOF SYSTEM

[75] Inventors: Allan O'Regan; Denis McGloughlin, both of Dublin, Ireland

[73] Assignee: Soldek Limited, Dublin, Ireland

[21] Appl. No.: 340,890

[22] Filed: Jan. 19, 1982

[51] Int. Cl.³ .............................................. E04B 1/74
[52] U.S. Cl. ....................... 52/404; 52/795;
52/579; 52/409; 126/449
[58] Field of Search ................. 52/795, 801, 404, 407,
52/409, 588, 268, 267, 265, 269, 579; 126/429,
449

[56] References Cited

U.S. PATENT DOCUMENTS

| 427,362 | 5/1890 | Rapp | 52/795 |
|---|---|---|---|
| 2,858,580 | 11/1958 | Thompson | 52/795 |
| 2,915,150 | 12/1959 | Weidler | 52/588 |
| 3,031,358 | 4/1962 | Rutter | 52/795 |
| 3,206,902 | 9/1965 | Turnbull | 52/795 |
| 3,324,617 | 6/1967 | Knight | 52/588 |
| 3,382,821 | 5/1968 | Pundr | 52/795 |
| 4,161,087 | 7/1979 | Levesque | 52/588 |
| 4,228,624 | 10/1980 | Reneault | 52/404 |
| 4,324,224 | 4/1982 | Cox | 126/429 |

Primary Examiner—Henry E. Raduazo
Attorney, Agent, or Firm—Birch, Stewart, Kolasch & Birch

[57] ABSTRACT

A wall system for the construction of buildings comprises an inner sheet steel facing panel having a base and two side walls extending along opposite substantially parallel side edges of the base and defining a recess with the base. A sheet of thermal and acoustic insulation material is located in the recess of the inner panel. An outer sheet steel facing panel having corrugations running in a direction substantially perpendicular to the side edges of the base is secured to the inner panel by fixing to flanges at the ends of the side walls of the inner panel.

3 Claims, 6 Drawing Figures

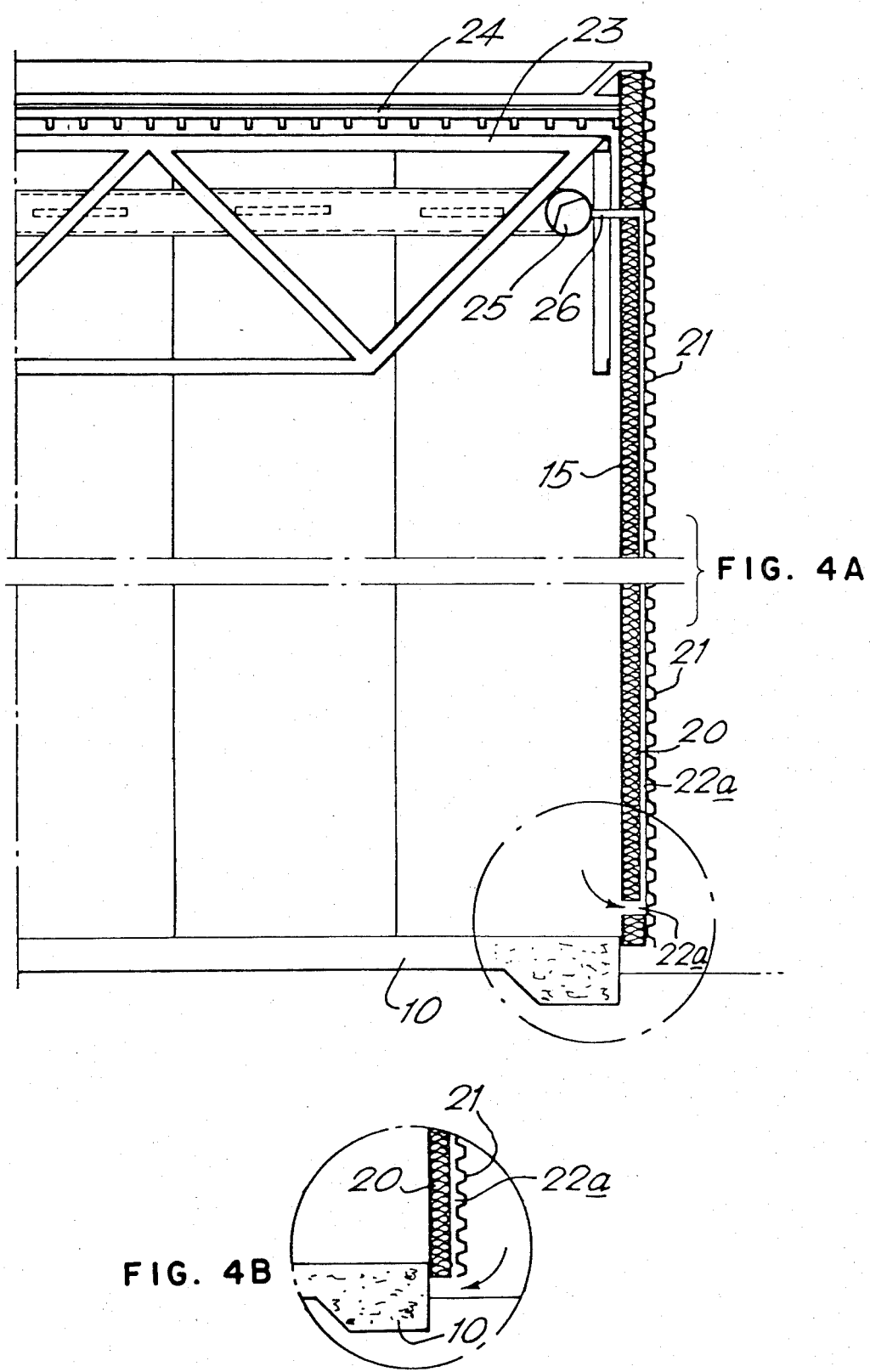

ROOF SYSTEM

BACKGROUND OF THE INVENTION

1. Field of the Invention

This invention relates to an exterior wall structure for a building and in particular to a wall structure which uses outer and inner wall facing panels which house an insulation material between them to give the wall system both a thermal and an acoustic insulation. The wall structure of the present invention has a particular application in the construction of buildings for industrial and warehousing use.

2. Brief Description of Background Art

Constructions of walls are known which employ metal outer and inner facing panels having an insulation layer betwen the panels. Such wall constructions have, however, demanded the use of spaced-apart vertical support columns between the wall base and the roof truss to hold the wall in position and to add strength to the wall and to give support for a roof structure. The use of vertical columns means that the positions of doors, windows and like wall openings are limited by the position of the columns and thus the design freedom for specific building usage is severely curtailed.

SUMMARY AND OBJECTS OF THE INVENTION

The present invention is directed towards overcoming the above problem associated with the known constructions of wall, and accordingly provides an exterior wall structure for a building comprising a plurality of inner wall facing panels each of shallow U-shaped cross-section comprising a base and two side walls with flanged ends extending along opposite substantially parallel side edges of the base to define a recess with the base, the inner wall facing panels being arranged in side-by-side abutting relation with the side walls thereof substantially vertical, a sheet of insulation material located in the recess of each inner wall facing panel, and a plurality of corrugated outer wall facing panels secured to the flanged ends of the inner wall facing panels, the corrugations in the outer wall facing panels being substantially horizontal and extending substantially the full height of the outer wall facing panels whereby the inner and outer wall facing panels cooperate to form a rigid structure resulting from the mutually perpendicular orientations of the corrugations in the outer panels and the side walls.

Preferably the inner and outer wall facing panels are of metal, e.g. 1 mm sheet steel, and in the case of the outer wall facing panels the sheet metal is galvanized. The insulation material is preferably a semi-rigid insulation board of the kind sold under the Trade Mark "ROCK WOOL". The outer wall facing panels are preferably secured to the flanged ends of the upper panels using self-tapping bolts or like fixing means.

BRIEF DESCRIPTION OF THE DRAWINGS

The invention will be understood from the following description of an embodiment thereof given by way of example only with reference to the accompanying drawings, in which:

FIGS. 4A and 4B show a side view of a wall structure of the present invention in use in the construction of a factory building, and illustrating specifically the construction of ducts to allow the use of solar energy for heating the building.

DETAILED DESCRIPTION OF THE INVENTION

Figure 1:
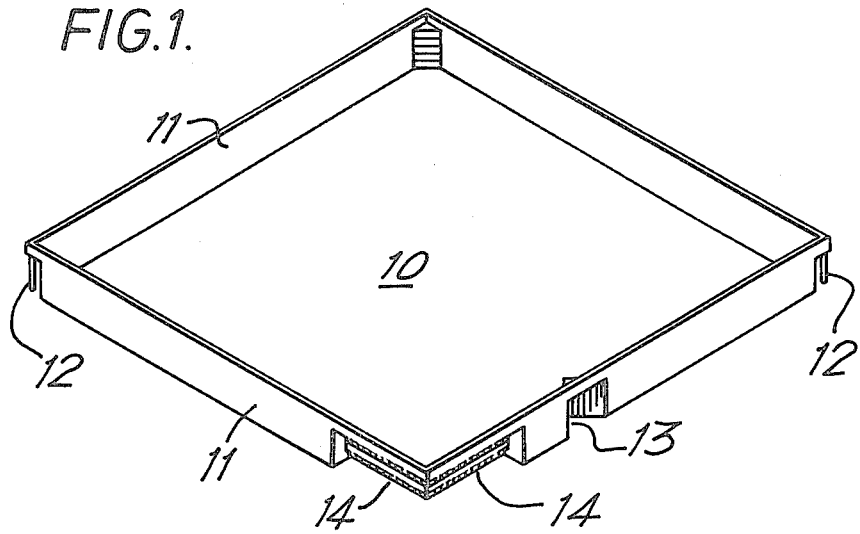
FIG. 1 is a schematic perspective view of a typical building incorporating the wall struction of the present invention.

Referring to the drawings, FIG. 1 illustrates the outline of a building (omitting the roof) comprising a floor area 10 and four exterior side walls 11 each constructed according to the present invention, the building also having four corner pillars 12, a doorway 13 and a recessed covered area 14.

Figure 3:
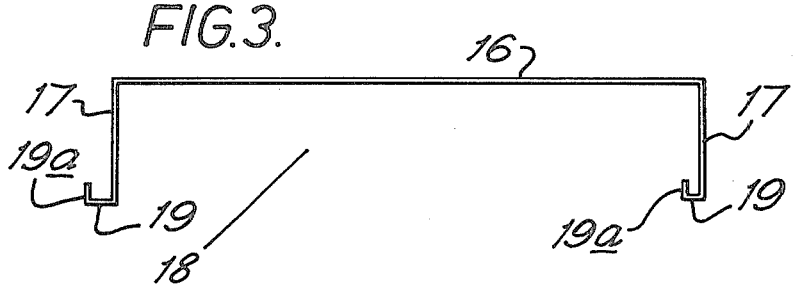
FIG. 3 is a plan view (not to scale) of an inner wall facing panel of a wall struction of the present invention.
Figure 3A:
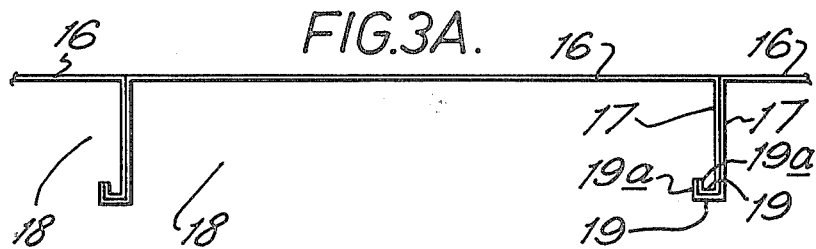
FIG. 3A is a plan view (not to scale) showing the manner in which a number of inner wall facing panels of a wall structure of the present invention are joined together.
Figure 2:
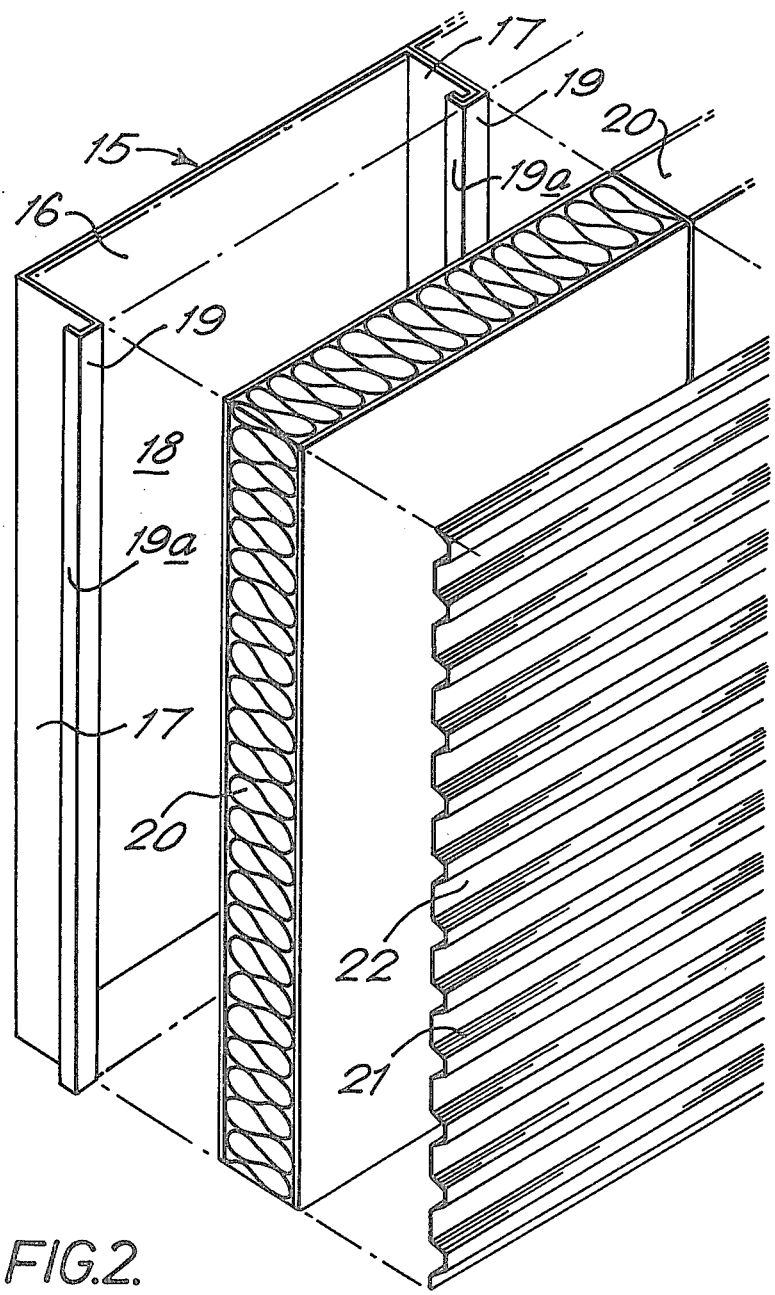
FIG. 2 is an exploded perspective view showing the constitutent components of a wall structure of the present invention.

As shown in FIGS. 2, 3, and 3A of the accompanying drawings, each exterior wall of the building is formed of a plurality of interlocking units of which each comprises a first (inner) plastics-clad steel sheel wall facing panel 15 having a shallow U-shaped cross section (FIG. 3) with a base 16 and two vertical side walls 17 extending along opposite substantially parallel side edges of the base 16 and defining with the latter a recess 18, the side walls 17 being formed with complementary flanged ends 19 including a turned-in edge 19a. A semi-rigid insulation sheet 20 of thermal and acoustic insulation material as sold under the Trade Mark "ROCK WOOL" is located in each recess 18, and a second (outer) galvanized sheet steel wall facing panel 21, the latter being corrugated with the corrugation channels 22 running substantially horizontally, is secured by self-tapping bolts (not shown) directly onto the flanged ends 19 of the inner wall facing panel 15.

In the construction of a complete wall, adjoining inner wall facing panels 15 are interlocked together edge-to-edge by the simple procedure of overlapping the complementary shaped flanged ends 19, 19a of adjoining panels 15 in the manner clearly illustrated in FIG. 3A of the drawings, it being understood that only after the interlocking of the inner panels 15 are the insulation sheets 20 and outer panels 21 assembled. It is to be noted that when interlocked in this fashion the bases 16 of the panels 15 are flush and present a continuous inner surface to the wall.

Referring to FIG. 4 of the accompanying drawings, a wall as above is shown in position between the base 10 of the building and a roof truss 23 with a roof 24 supported thereon. The use of the wall system of the present invention allows one to use solar energy as an aid to heating and/or ventilating the building. It will be appreciated that between the inner surface of the outer wall facing panel 21 and the outer surface of the insulation sheet 20 housed in the recess 18 of the inner wall facing panel 15 there is a relatively narrow channel 22a which allows the circulation of air. Each wall span is provided with a duct system 25 which allows air in the channel 22a heated by the sun impinging on the outer wall facing panel 21 to be circulated into the building to aid and/or fully heat the building. The heat provided in this manner would in normal climatic conditions be sufficient to heat fully an office complex within a conventional factory unit. The air may be drawn into the system, i.e. the channel 22a, from inside the building or from outside the building (as shown in the insert detail). The air in the channel 22a is heated by the sun impinging on the panel 21. The heated air rises and passes through a connecting duct 26 to the duct system 25 of the building.

The present invention thus provides a wall structure the construction of which allows one to place a door, window or other opening anywhere in the span of the wall substantially without limitation, since no vertical support columns are employed, and without impairing the overall structural strength of the wall which is inherent in the construction due to the use of vertical side walls 17 in the inner wall facing panels 15 in conjunction with horizontal channels 22 in the corrugated outer wall facing panels 21.

I claim:

1. An exterior wall structure for a building comprising:
   a base having a height and width of a predetermined dimension;
   a side wall extending along a height dimension on each side of said base;
   a flange end being formed on each side wall and being spaced a predetermined distance from said base to define a recess;
   said base, side walls and flanged ends forming shallow U-shaped panels with said base forming an inner wall;
   a plurality of said inner wall facing panels being arranged in side-by-side abutting relation with the side walls thereof being substantially vertical;
   a sheet of insulation material located in the recess of each inner wall facing panel; and
   a plurality of corrugated outer wall facing panels secured to the flanged ends of the inner wall facing panels, the corrugations in the outer wall facing panels being substantially horizontal and extending substantially the full height of the outer wall facing panels whereby the inner and outer wall facing panels cooperate to form a rigid structure resulting from the mutually perpendicular orientations of the corrugations in the outer panels and the side walls of the inner panels;
   wherein the base of each inner wall facing panel is flat and the inner wall facing panels interlock with their bases flush to form a continuous flat inner surface to the wall structure.

2. A wall structure according to claim 1, wherein the flanged ends on the opposite side walls of the base are of complementary formation and include a turned-in edge to provide edge-to-edge interlocking of the abutting inner wall facing panels.

3. A wall structure according to claim 1, further including a space between the insulating material and the inside surface of the outer wall facing panels, means permitting air to enter the said space adjacent the bottom of the wall structure, and means for ducting air from the said space adjacent the top of the wall structure into the interior of the building.

* * * * *